United States Patent
Martin (10) Patent No.: US 10,829,608 B2
(45) Date of Patent: Nov. 10, 2020

(54) ARTICLE COMPRISING TUBULAR PARTICLES

(71) Applicant: BASF SE, Ludwigshafen am Rhein (DE)

(72) Inventor: Brad J. Martin, Dearborn, MI (US)

(73) Assignee: BASF SE, Ludwigshafen am Rhein (DE)

( * ) Notice: Subject to any disclaimer, the term of this patent is extended or adjusted under 35 U.S.C. 154(b) by 196 days.

(21) Appl. No.: 15/564,949

(22) PCT Filed: May 19, 2016

(86) PCT No.: PCT/US2016/033298
§ 371 (c)(1),
(2) Date: Oct. 6, 2017

(87) PCT Pub. No.: WO2016/187438
PCT Pub. Date: Nov. 24, 2016

(65) Prior Publication Data
US 2018/0112053 A1    Apr. 26, 2018

Related U.S. Application Data

(60) Provisional application No. 62/163,576, filed on May 19, 2015.

(51) Int. Cl.
*C08J 9/232* (2006.01)
*C08J 9/36* (2006.01)
(Continued)

(52) U.S. Cl.
CPC .................. *C08J 9/232* (2013.01); *B29B 9/06* (2013.01); *B29C 44/1285* (2013.01);
(Continued)

(58) Field of Classification Search
None
See application file for complete search history.

(56) References Cited

U.S. PATENT DOCUMENTS 3,401,128 A    9/1968  Terry
5,674,600 A    10/1997 Hargarter et al.
(Continued)

FOREIGN PATENT DOCUMENTS

CN    101370861       2/2009
CN    103781830 A     5/2014
(Continued)

OTHER PUBLICATIONS

Office Action and Search Report from counterpart Russian Application No. 2017144275/04 dated Jun. 17, 2019.
(Continued)

*Primary Examiner* — Ronak C Patel
(74) *Attorney, Agent, or Firm* — DLA Piper LLP (US)

(57) ABSTRACT

This disclosure provides an article having a density of from 0.03 to 0.45 g/cc and including a plurality of anisotropic tubular particles that are randomly oriented in the article. The tubular particles include a thermoplastic elastomer foam and a polymer disposed on an exterior surface of the thermoplastic elastomer foam as an outermost layer of the particles. Each of the thermoplastic elastomer foam and the polymer independently has a softening temperature determined according to DIN ISO306. The softening temperature of the polymer is at least 5° C. lower than the softening temperature of the thermoplastic elastomer foam.

18 Claims, 2 Drawing Sheets

(51) Int. Cl.
| | |
|---|---|
| C08J 9/16 | (2006.01) |
| C08J 9/34 | (2006.01) |
| C08G 18/48 | (2006.01) |
| C08G 18/42 | (2006.01) |
| C08G 18/32 | (2006.01) |
| B29C 44/12 | (2006.01) |
| B29C 48/09 | (2019.01) |
| B29C 48/21 | (2019.01) |
| B29C 48/00 | (2019.01) |
| C08J 3/12 | (2006.01) |
| B29B 9/06 | (2006.01) |
| B32B 1/08 | (2006.01) |
| B32B 5/20 | (2006.01) |
| B32B 27/40 | (2006.01) |
| B29K 75/00 | (2006.01) |
| C08G 101/00 | (2006.01) |
| B29K 105/04 | (2006.01) |

(52) U.S. Cl.
CPC ........ *B29C 48/0022* (2019.02); *B29C 48/022* (2019.02); *B29C 48/09* (2019.02); *B29C 48/21* (2019.02); *B32B 1/08* (2013.01); *B32B 5/20* (2013.01); *B32B 27/40* (2013.01); *C08G 18/3203* (2013.01); *C08G 18/3206* (2013.01); *C08G 18/4244* (2013.01); *C08G 18/48* (2013.01); *C08J 3/126* (2013.01); *C08J 9/16* (2013.01); *C08J 9/34* (2013.01); *C08J 9/365* (2013.01); *B29K 2075/00* (2013.01); *B29K 2105/04* (2013.01); *C08G 2101/005* (2013.01); *C08J 2201/03* (2013.01); *C08J 2300/22* (2013.01); *C08J 2300/26* (2013.01); *C08J 2375/04* (2013.01); *C08J 2375/08* (2013.01); *C08J 2475/04* (2013.01); *C08J 2475/08* (2013.01)

(56) References Cited

U.S. PATENT DOCUMENTS

| | | | |
|---|---|---|---|
| 5,880,250 A | 3/1999 | Housel et al. | |
| 7,201,625 B2 | 4/2007 | Yeh | |
| 9,884,947 B2 | 2/2018 | Prissok et al. | |
| 10,119,775 B2 | 11/2018 | Dekoninck et al. | |
| 2010/0222442 A1* | 9/2010 | Prissok | C08G 18/4854 521/60 |
| 2010/0291835 A1* | 11/2010 | Omoto | C08G 18/48 450/39 |
| 2010/0301509 A1 | 12/2010 | Nehls et al. | |
| 2013/0017391 A1* | 1/2013 | Kato | C08J 9/122 428/317.3 |
| 2013/0291409 A1* | 11/2013 | Reinhardt | A43B 13/04 36/30 R |
| 2014/0017450 A1* | 1/2014 | Baghdadi | B29C 44/3415 428/160 |
| 2014/0223776 A1* | 8/2014 | Wardlaw | A43B 3/0042 36/102 |
| 2014/0366405 A1 | 12/2014 | Reinhardt et al. | |

FOREIGN PATENT DOCUMENTS

| | | |
|---|---|---|
| CN | 104558496 A | 4/2015 |
| EA | 16841 B1 | 7/2012 |
| EP | 0679168 B1 | 6/2000 |
| EP | 0679168 B2 | 12/2003 |
| JP | 2000-107785 A | 4/2000 |
| JP | 2000-186139 A | 7/2000 |
| RU | 2205754 C2 | 6/2003 |
| RU | 2488616 C2 | 7/2013 |
| WO | 99/29483 A1 | 6/1999 |
| WO | 2008/018966 A2 | 2/2008 |
| WO | 2001/064414 A1 | 1/2014 |
| WO | 2014/150122 | 9/2014 |
| WO | 2016187442 A1 | 11/2016 |

OTHER PUBLICATIONS

International Preliminary Report on Patentability from corresponding International Application No. PCT/US2016/033298; dated Nov. 30, 2017.
International Preliminary Report on Patentability from corresponding International Application No. PCT/US2016/033304; dated Nov. 30, 2017.
International Search Report for Application No. PCT/US2016/033304 dated Aug. 1, 2016, 3 pages.
International Search Report for Application No. PCT/US2016/033298 dated Aug. 8, 2016, 3 pages.
Kurtz Ersa, "Particle Foam Machines", downloaded from http://www.kurtz-services.com/particle-foam-machines-en.html on Oct. 13, 2014, 1 page.
Kurtz Ersa, "Particle Foam Machines—Products", downloaded from http://www.kurtz-services.com/products-en.html on Oct. 13, 2014, 1 page.
Non-Final Office Action from counterpart U.S. Appl. No. 15/564,977 dated Aug. 16, 2019.
First Office Action from counterpart Chinese Patent Application No. 201680028639.8 dated Mar. 6, 2020, along with its English translation.
Notice of Reasons for Refusal from corresponding Japanese Patent Appln. No. 2017-560286 dated Jun. 30, 2020, and its English translation.

* cited by examiner

ARTICLE COMPRISING TUBULAR PARTICLES

RELATED APPLICATIONS

The present application is the National Stage of International Patent Application No. PCT/US2016/033298, filed May 19, 2017, which claims priority to U.S. Provisional Application No. 62/163,576, filed May 19, 2015, the disclosure of which is specifically incorporated by reference in its entirety.

FIELD OF THE DISCLOSURE

The present disclosure generally relates to an article having a particular density and including a plurality of anisotropic tubular particles. More specifically, the tubular particles include a thermoplastic elastomer foam and a polymer disposed on an exterior surface of the thermoplastic elastomer foam as an outermost layer of the particles.

BACKGROUND

Thermoplastic foam particles can be used to form a cushion-like material by combining the particles loosely or binding them together to form a connected network of particles. Binding of particles can be achieved by using thermoset glues or using temperature and pressure along with the particles' inherent thermoplastic (melting) behavior to fuse them to one another. During the binding process, particles are usually placed in a mold under pressure to form an article. If using temperature to bind the particles (e.g. by steam chest crack molding), the melting point of the particles is usually approached/exceeded to enable fusion in the mold. Elevated temperatures coupled with pressure in the mold can have an unintended consequence of permanently distorting the particles which leads to unwanted shrinkage of the article. Accordingly, there remains opportunity for improvement.

SUMMARY OF THE DISCLOSURE

This disclosure provides an article having a density of from 0.03 to 0.45 g/cc and including a plurality of anisotropic tubular particles that are randomly oriented in the article. The tubular particles include a thermoplastic elastomer foam and a polymer disposed on an exterior surface of the thermoplastic elastomer foam as an outermost layer of the particles. Each of the thermoplastic elastomer foam and the polymer independently has a softening temperature determined according to DIN ISO306. The softening temperature of the polymer is at least 5° C. lower than the softening temperature of the thermoplastic elastomer foam.

This disclosure also provides a method of forming the article. The method includes the step of providing a thermoplastic elastomer and the polymer and the step of co-extruding the thermoplastic elastomer and the polymer to form a tubular extrudate wherein the thermoplastic elastomer is foamed to form a thermoplastic elastomer foam during co-extrusion and the polymer is disposed on an exterior surface of the thermoplastic elastomer foam as an outermost layer of the tubular extrudate. The method also includes the step of segmenting the tubular extrudate to form the plurality of anisotropic tubular particles. Furthermore, the method includes the steps of disposing the plurality of anisotropic tubular particles in a mold and heating the plurality of anisotropic tubular particles to form the article such that the plurality of anisotropic tubular particles are randomly oriented in the article.

BRIEF DESCRIPTION OF THE FIGURES

Other advantages of the present disclosure will be readily appreciated, as the same becomes better understood by reference to the following detailed description when considered in connection with the accompanying drawings wherein.

DETAILED DESCRIPTION OF THE PRESENT DISCLOSURE

Figure 5:
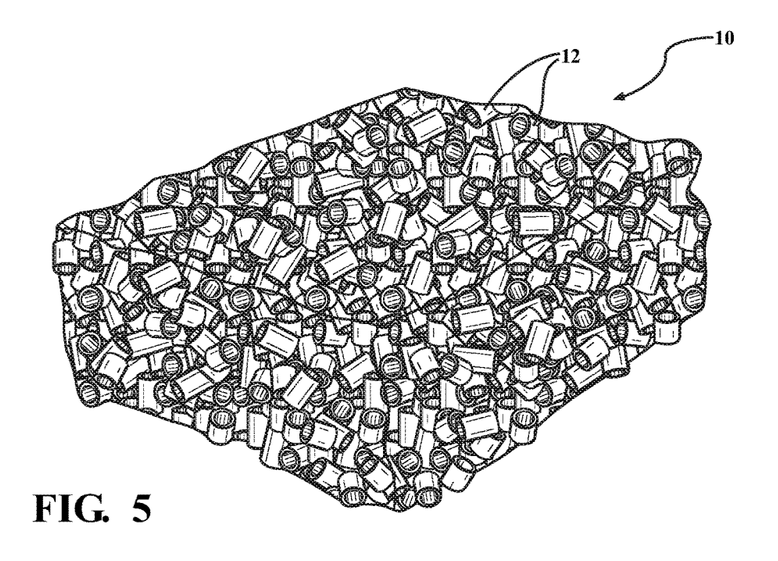
FIG. 5 is a side cross-sectional view of one embodiment of the article of the instant disclosure.

This disclosure provides an article (10) having a density of from 0.03 to 0.45 g/cc, e.g. as shown in FIG. 5. The article (10) itself is not particularly limited in dimensions, size, or type. In various embodiments, the article (10) is a shoe sole, a furniture cushion, an automobile cushion, a mattress, a flooring surface, a flooring substrate, etc. In other embodiments, the density of the article (10) is from 0.03 to 0.4, from 0.05 to 0.4, from 0.1 to 0.35, from 0.15 to 0.3, from 0.2 to 0.25, from 0.03 to 0.1, from 0.03 to 0.25, from 0.03 to 0.2, from 0.03 to 0.15, from 0.03 to 0.05, from 0.04 to 0.09, from 0.05 to 0.08, from 0.06 to 0.07, from 0.1 to 0.45, from 0.15 to 0.4, from 0.2 to 0.35, or from 0.25 to 0.3, g/cc (or g/ml). The article (10) also typically has an ultimate breaking strength of from 0.1 to 4.0 megapascal, from 0.4 to 3.0 megapascal, or from 0.5 to 1.5 megapascal, as determined using ASTM D 5035. In various additional non-limiting embodiments, all values and ranges of values between and including the aforementioned values are hereby expressly contemplated.

Figure 4:
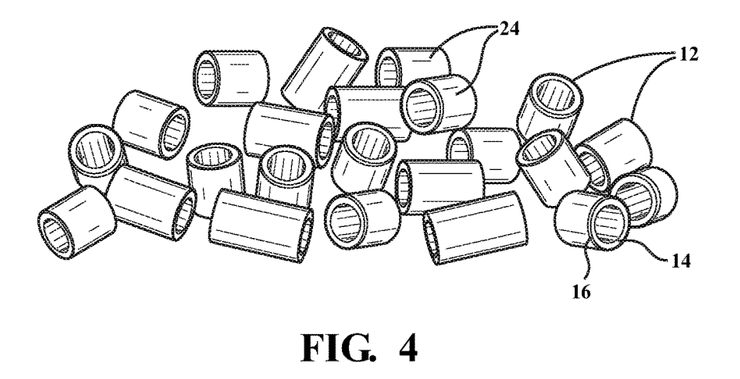
FIG. 4 is a side cross-sectional view of one embodiment of a plurality of particles of the instant disclosure.

Anisotropic Tubular Particles:

The article (10) includes a plurality of anisotropic tubular particles (12), hereinafter described as "particles (12)", e.g. as shown in FIG. 4. The terminology "plurality" describes that the article (10) includes multiple particles (12), i.e., three or more. The terminology "anisotropic" describes that the particles (12) exhibit physical properties that have different values when measured in different directions. For example, the particle may require a particular amount of force to collapse the particle when that force is applied to the side of the particle. This required amount of force may be different when applied to the end of the particle to collapse the particle. The particles (12) are tubular and may be solid or hollow. In one embodiment, the particles (12) are described as hollow cylinders. In another embodiment, the particles (12) are described as solid cylinders.

The cross-section of the particles (12) may be circular, oval, square, rectangular, or any other shape. In other words, the terminology "tubular" is not limited to circular or oval cross section. However, in the Figures, the cross-sections are approximately circular. The particles (12) may be described as hollow or solid shapes having a length and a cross-section that may be any shape. In other embodiments, the particles (12) are curved/bent tubular shapes or bellowed/"accordion"

shapes. Curving/bending the particles (12) can result in different properties, as will bellowing the particles (12). The particles (12) may be alternatively described as pipes, conduits, tubes, cylinders, etc. The use of tubular particles typically allows for lower bulk density of the article to be achieved. Said differently, the geometry of the particles typically allows for increased density reduction, for example, relative to a comparative article that is formed without the technology of this disclosure.

The particles (12) are randomly oriented in the article (10), e.g. in three dimensions. In other words, the particles (12) are not disposed uni-directionally or in any particular direction or directions in the article (10). The particles (12) are typically randomly oriented or dispersed in the article (10) in the x, y, and z dimensions. Typically, a cross-section of the article (10) would reveal no pattern to the orientation or dispersion of the particles (12) in the article (10).

The particles (12) are typically fused together but do not necessarily have to be "fused" so long as the article has the aforementioned density. In one embodiment, some of the particles (12) are fused together and others are not. Typically, if fused, the particles (12) are fused using the method described below. The particles (12) may be fused together at a plurality of points, e.g. along an edge of the particles (12) or along or across an exterior surface (26) of the particles (12). Alternatively, the particles (12) may be fused together at one or more interfaces of exterior layers of various particles (12). The particles may be melted together or otherwise adhered to one another, in any way, so long as the aforementioned density is achieved.

The particles (12) include a thermoplastic elastomer foam (14) and a polymer (16) disposed on an exterior surface (26) of the thermoplastic elastomer foam (14) as an outermost layer (24) of the particles (12). This polymer (16) may be alternatively described as an "exterior" polymer (16). The terminology "outermost" or "exterior" may describe that one side of the layer is exposed to the environment and is not in contact with any other layer. In other words, an outermost layer is not sandwiched between any other layers.

The particles (12) may be, include, consist essentially of, or consist of, the thermoplastic elastomer foam (14) and the polymer (16). The terminology "consists essentially of" describes that, in various embodiments, the particles (12) are free of polymers that are not the thermoplastic elastomer foam (14) or the polymer (16) and may be free or, or may include, various polymer additives and/or processing additives known in the art.

Neither the thermoplastic elastomer foam (14) nor the polymer (16) is particularly limited to any thickness, length, width, or height in the particles (12). Typically, the thermoplastic elastomer foam (14) has a thickness of from 0.5 to 50, from 1 to 30, or from 1 to 10, mm in the particles (12). Similarly, the polymer (16) typically has a thickness of from 0.001 to 10, from 0.005 to 5, or from 0.01 to 1, mm in the particles (12). In various additional non-limiting embodiments, all values and ranges of values between and including the aforementioned values are hereby expressly contemplated.

The particles (12) themselves are also not particularly limited to any thickness, length, width, or height. In various embodiments, the particles (12) have a length from 1 to 50, from 1 to 40, or from 1.5 to 30, mm. In other embodiments, the particles (12) have a diameter from 1 to 100, from 1 to 50, or from 1 to 30, mm. In still other embodiments, the size of the particles (12) is designed such that they have diameters of about 0.5 mm to about 25 mm. The diameters of the particles (12) may be about 2 mm to about 10 mm or about 3 mm to about 8 mm. In various additional non-limiting embodiments, all values and ranges of values between and including the aforementioned values are hereby expressly contemplated.

Thermoplastic Elastomer Foam:

The thermoplastic elastomer foam (14) is not particularly limited so long as it is a foam. However, the thermoplastic elastomer foam (14) is typically formed from a thermoplastic elastomer that is not foamed. In one embodiment, and as described below, the thermoplastic elastomer foam (14) is typically foamed during extrusion of a non-foamed thermoplastic elastomer. For example, a non-foamed thermoplastic elastomer may be provided to an extruder (e.g. in pellet form) and then, during the process of extrusion, may be foamed to form the thermoplastic elastomer foam (14). Additional process steps may also be useful such as adding expandable microspheres, adding blowing agents, e.g. $NaHCO_3$ or citric acid, or adding gas, e.g. $CO_2$, $N_2$, or Ar, by injection into a melt. Combinations of these steps may also be used. As described below, the terminology "thermoplastic elastomer" and "thermoplastic elastomer foam (14)" may be used interchangeably in various non-limiting embodiments.

In various embodiments, the thermoplastic elastomer foam (14) is produced using a non-foamed thermoplastic elastomer having a durometer from Shore 40A to 83D as determined using DIN ISO 7619-1. In various embodiments, the non-foamed thermoplastic elastomer used to form the thermoplastic elastomer foam (14) has a durometer from 40A to 83D, from 60A to 70D, or from 80A to 95A, as determined using DIN ISO 7619-1. The thermoplastic elastomer foam (14) itself typically has a density from 0.1 to 0.6, from 0.15 to 0.55, from 0.2 to 0.5, from 0.25 to 0.45, from 0.3 to 0.4, from 0.3 to 0.35, or from 0.35 to 0.4, g/cc (or g/ml). In still other embodiments, all values and ranges of values between the aforementioned values are hereby expressly contemplated.

The thermoplastic elastomer and/or thermoplastic elastomer foam (14) may be chosen from thermoplastic polyurethane elastomers (TPU), thermoplastic co-polyester elastomers (TPC), thermoplastic styrenic elastomers (TPS), thermoplastic polyamides (TPA), thermoplastic vulcanates (TPV), thermoplastic polyolefins (TPO), and combinations thereof.

Thermoplastic Polyurethane Elastomers:

Thermoplastic polyurethane elastomers (e.g. foamed or non-foamed) may also be described herein simply as TPUs, thermoplastic polyurethanes, or TPE-U's. Thermoplastic polyurethane elastomers typically include linear segmented polymeric blocks including hard and soft segments. Without intending to be bound by any particular theory, it is believed that the soft segments are of low polarity and form an elastomer matrix which provides elastic properties to the thermoplastic polyurethane. The hard segments are believed to be shorter than the soft segments, to be of higher polarity, and act as multifunctional tie points that function both as physical crosslinks and reinforcing fillers. The physical crosslinks are believed to disappear when heat is applied, thus allowing the thermoplastic polyurethanes to be used in the variety of processing methods.

The thermoplastic polyurethane may be further defined as a polyether thermoplastic polyurethane, a polyester thermoplastic polyurethane, or a combination of a polyether thermoplastic polyurethane and a polyester thermoplastic polyurethane. That is, the non-foamed and/or the foamed thermoplastic polyurethane may be further defined as including or being the reaction product of an isocyanate and a polyether polyol, a polyester polyol, an aliphatic or olefinic polyol or a combination of these polyols. Alternatively, the non-foamed and/or the foamed thermoplastic polyurethane may be further defined as a multi-block copolymer produced from a poly-addition reaction of an isocyanate with a linear polymeric glycol (e.g. having a weight average molecular weight of from 500 to 8,000 g/mol), low molecular weight diol (e.g. having a weight average molecular weight of from 50 to 600 g/mol), and or/polyol. Typically, non-foamed and/or foamed thermoplastic polyurethanes can be obtained by varying a ratio of hard segments and soft segments, as described above. Physical properties such as shore Hardness, along with modulus, load-bearing capacity (compressive stress), tear strength, and specific gravity, typically increases as a ratio of hard segments to soft segments increases.

In one embodiment, the non-foamed and/or the foamed thermoplastic polyurethane is a polyester thermoplastic polyurethane and includes the reaction product of a polyester polyol, an isocyanate component, and a chain extender. Suitable polyester polyols are typically produced from a reaction of a dicarboxylic acid and a glycol having at least one primary hydroxyl group. Suitable dicarboxylic acids include, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols include, but are not limited to, ethylene glycol, butylene glycol, hexanediol, bis(hydroxymethylcyclohexane), 1,4-butanediol, diethylene glycol, 2-methylpropanediol, 3-methyl-pentanediol, 2,2-dimethyl propylene glycol, 1,3-propylene glycol, and combinations thereof.

In an alternative embodiment, the non-foamed and/or the foamed thermoplastic polyurethane is a polyester thermoplastic polyurethane and includes the reaction product of a suitable chain extender, an isocyanate component, and a polymeric polyol. Suitable chain extenders include, but are not limited to, diols including ethylene glycol, propylene glycol, butylene glycol, 1,4-butanediol, butenediol, butynediol, 2-ethyl-1,3-hexanediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol, diamines including ethylene diamine, propylene diamine, butylene diamine, hexamethylene diamine, cyclohexalene diamine, phenylene diamine, tolylene diamine, xylylene diamine, 3,3'-dichlorobenzidine, 3,3'- and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. Specific examples of suitable polyester thermoplastic polyurethanes that can be used in this invention include, but are not limited to, Elastollan® 600, 800, B, C, and S Series polyester thermoplastic polyurethanes commercially available from BASF Corporation.

In a further embodiment, the non-foamed and/or the foamed thermoplastic polyurethane is a polyether thermoplastic polyurethane and includes the reaction product of a polyether polyol, an isocyanate component, and a chain extender. Suitable polyether polyols include, but are not limited to, polytetramethylene glycol, polyethylene glycol, polypropylene glycol, and combinations thereof. In yet another embodiment, the non-foamed and/or the foamed thermoplastic polyurethane is a polyether thermoplastic polyurethane and includes the reaction product of a chain extender and an isocyanate component. It is to be understood that any chain extender known in the art can be used by one of skill in the art depending on the desired properties of the thermoplastic polyurethane. Specific examples of suitable polyether thermoplastic polyurethanes that may be used in this invention include, but are not limited to, Elastollan® 1000, 1100 and 1200 Series polyether thermoplastic polyurethanes commercially available from BASF Corporation.

In a further embodiment, the non-foamed and/or the foamed thermoplastic polyurethane is an aliphatic or olefinic thermoplastic polyurethane and includes the reaction product of an aliphatic or olefinic thermoplastic polyol, an isocyanate component and a chain extender. Suitable polyether polyols include, but are not limited to, hydrogenated polybutadiene or non-hydrogenated polybutadiene and combinations thereof or in combination with polyester and/or polyether polyol. It is to be understood that any chain extender known in the art can be used by one of skill in the art depending on the desired properties of the thermoplastic polyurethane.

Typically, the polyether, polyester, aliphatic or olefinic polyols used to form the non-foamed and/or the foamed thermoplastic polyurethane have a weight average molecular weight of from 600 to 3,000 g/mol. However, the polyols are not limited to this molecular weight range. In one embodiment, starting materials used to form the non-foamed and/or the foamed thermoplastic polyurethane (e.g., a linear polymeric glycol, a low molecular weight diol, and/or a polyol) have average functionalities of approximately 2. For example, any pre-polymer or monomer can have 2 terminal reactive groups to promote formation of high molecular weight linear chains with no or few branch points in the non-foamed and/or the foamed thermoplastic polyurethane.

The isocyanate component that is used to form the non-foamed and/or the foamed thermoplastic polyurethane typically includes, but is not limited to, isocyanates, diisocyanates, polyisocyanates, and combinations thereof. In one embodiment, the isocyanate component includes an n-functional isocyanate. In this embodiment, n is a number typically from 2 to 5, more typically from 2 to 4, still more typically of from 2 to 3, and most typically about 2. It is to be understood that n may be an integer or may have intermediate values from 2 to 5. The isocyanate component typically includes an isocyanate selected from the group of aromatic isocyanates, aliphatic isocyanates, and combinations thereof. In another embodiment, the isocyanate component includes an aliphatic isocyanate such as hexamethylene diisocyanate (HDI), dicyclohexyl-methyl-diisocyanate (H12MDI), isophoron-diisocyanate, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component can include an aromatic isocyanate. If the isocyanate component includes an aromatic isocyanate, the aromatic isocyanate typically corresponds to the formula $R'(NCO)_z$ wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof. The isocyanate component can also react with the polyol and/or chain extender in any amount, as determined by one skilled in the art.

Thermoplastic Polyester Elastomers:

The thermoplastic elastomer foam may alternatively be a thermoplastic polyester elastomer, also known as a TPC. Thermoplastic elastomers are may also be described as thermoplastic rubbers and are typically a class of copolymers or a physical mix of polymers (e.g. a plastic and a rubber) which have both thermoplastic and elastomeric properties. Non-limiting examples of thermoplastic polyester elastomers are Arnitel from DSM and Hytrel from DuPont.

Thermoplastic Styrenic Elastomers:

The thermoplastic elastomer (foam) may alternatively be a thermoplastic styrenic elastomer, also known as a styrol, styrenic block copolymer with ethylene, propylene, butadiene, isoprene units, or a TPS. Thermoplastic styrenic elastomers are typically based on A-B-A type block structure where A is a hard phase and B is an elastomer. Non-limiting examples of thermoplastic styrenic elastomers are Kraton D and Kraton G.

Thermoplastic Vulcanizate Elastomers:

The thermoplastic elastomer (foam) may alternatively be a thermoplastic vulcanate elastomer, also known as a TPV. A non-limiting example of a thermoplastic vulcanate elastomer is Santoprene from ExxonMobil.

Thermoplastic Polyamide Elastomers:

The thermoplastic elastomer (foam) may alternatively be a thermoplastic polyamide elastomer, also known as a TPA. A non-limiting example of a thermoplastic polyamide elastomer is Vestamid E from Evonik.

Thermoplastic Polyolefin Elastomers:

The thermoplastic elastomer (foam) may alternatively be a thermoplastic polyolefin elastomer, also known as a TPO. A non-limiting example of a thermoplastic polyolefin elastomer is Engage from Dow.

Polymer:

Referring back to the polymer (16) itself, the polymer (16) is disposed on an exterior surface (26) of the thermoplastic elastomer foam (14) as the outermost layer (24) of the particles (12). The polymer (16) may be disposed on, and in direct contact with, the exterior surface (26) of the thermoplastic elastomer foam (14), e.g. as set forth in FIG. 1, or may be disposed on, and spaced apart from, the exterior surface (26) of the thermoplastic elastomer foam (14), as set forth in FIG. 2. A single polymer (16) may be used or a combination of polymers may be used. The polymer (16) may be chemically the same as the thermoplastic elastomer foam (14) or may be chemically different from the thermoplastic elastomer foam (14).

The polymer (16) is not particularly limited apart from the softening temperature described in greater detail below. The polymer (16) may be, include, consist essentially of, or consist of a polymer chosen from polyurethanes (foamed or non-foamed), thermoplastic elastomers (foamed or non-foamed), polyalkylenes, such as polyethylenes, polypropylenes, polyalkylene naphthalates and terephthalates, polyimides, polyamides, polyetherimides, polystyrenes, acrylonitriles, polycarbonates, polyalkylacrylates, polyacrylates, derivatives of cellulose, halogenated polymers, polysulfones, polyethersulfones, polyacrylonitrile, silicones, epoxies, polyvinylacetates, polyether-amides, ionomeric resins, elastomers, styrene-butadiene copolymers, styrene-acrylonitrile copolymer, polyesters, polyolefins, polystyrenes, isomers thereof, copolymers thereof, and combinations thereof. In one embodiment, the polymer is foamed. In another embodiment, the polymer is not foamed. In various embodiments, the polymer (16) is chosen from Elastollan 880A13N, Elastollan ER368511, and combinations thereof. In other embodiments, the polymer (16) is chosen from foamed thermoplastic elastomers (different from any described above), unfoamed thermoplastic elastomers (different from any described above), unfoamed thermoplastic elastomers such as TPS, TPV, TPO, and TPA, and combinations thereof.

In various embodiments, the thermoplastic elastomer foam (14) may be formed utilizing one or more of the aforementioned polymers, e.g. in amount of up to about 50 weight percent of the polymers. In various embodiments, the thermoplastic elastomer foam (14) is formed using 1, 2, 3, 4, 5, 10, 15, 20, 25, 30, 35, 40, 45, or 50, weight percent of one or more of the aforementioned polymers with the balance being the thermoplastic elastomer. In various additional non-limiting embodiments, all values and ranges of values between and including the aforementioned values are hereby expressly contemplated.

Softening Temperature:

Each of the thermoplastic elastomer foam (14) and the polymer (16) independently has a softening temperature determined according to ASTM DIN ISO 306. The softening temperature of the polymer (16) is at least 5° C. lower than the softening temperature of the thermoplastic elastomer foam (14). Without intending to be limited by any particular theory, it is believed that the lower softening temperature of the polymer allows the particles to be heated to this lower softening temperature, thereby softening or plasticizing the polymer and allowing the polymer to become sticky, thereby adhering particles together. Since the softening temperature of the polymer is lower than the softening temperature of the thermoplastic elastomer foam (14), the thermoplastic elastomer foam (14) itself does not melt/soften and thereby can retain its properties and dimensions. This typically results in an article that does not suffer from shrinkage after removal from the mold along with densification i.e., an unwanted increase in density due to compaction/consolidation/agglomeration of the thermoplastic elastomer foam (14) in the particles themselves.

In various embodiments, the softening temperature of the polymer (16) is at least 5, 10, 15, 20, 25, 30, 35, 40, 45, or 50, or even more, ° C. lower than the softening temperature of the thermoplastic elastomer foam (14). In still other embodiments, the softening temperature of the polymer (16) is from 5 to 20, from 10 to 20, from 15 to 50, from 20 to 45, from 25 to 40, from 30 to 35, from 15 to 30, from 15 to 25, or from 15 to 20, ° C. lower than the softening temperature of the thermoplastic elastomer foam (14). In various embodiments, the softening temperature of the thermoplastic elastomer foam (14) is from 80 to 180, from 90 to 160, from 100 to 160, or from 110 to 150, ° C. In other embodiments, the softening temperature of the polymer (16) is from 40 to 120, from 50 to 100, from 60 to 80, from 60 to 70, from 60 to 65, or from 60 to 70, ° C. Differences in melting or softening points of the thermoplastic elastomer and the polymer, either as part of the particles individually, or even if measured after the article is formed, may be detected by various analytical procedures, such as by using DSC instrumentation and procedures. In various additional non-limiting embodiments, all values and ranges of values between and including the aforementioned values are hereby expressly contemplated.

Figures 1, 2:
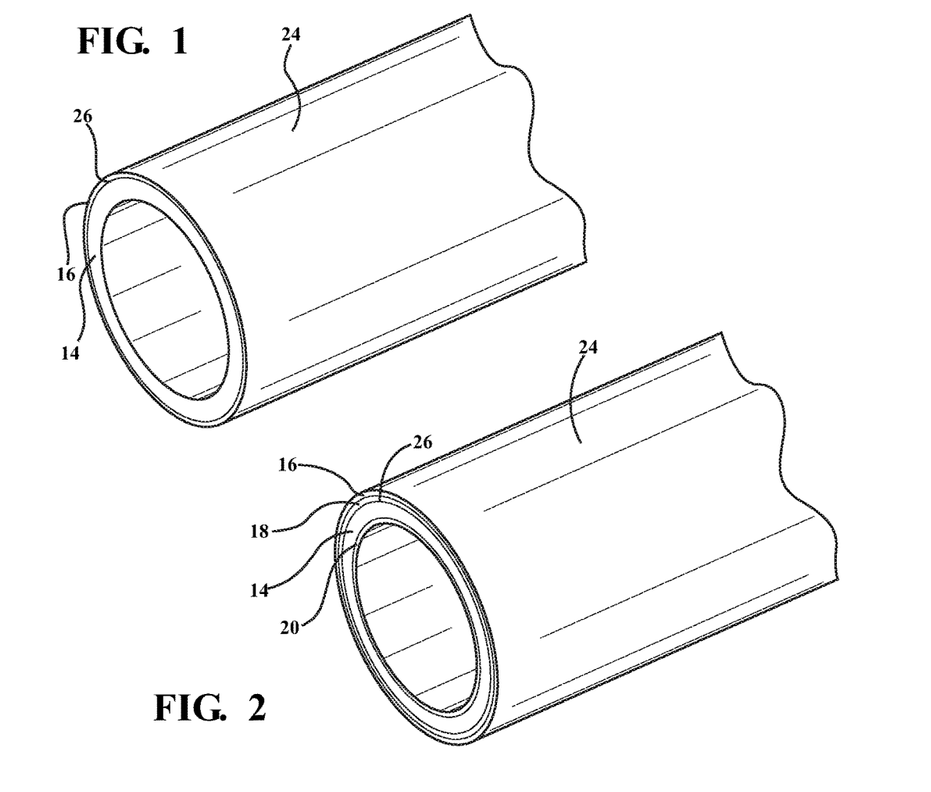
FIG. 1 is a side cross-sectional view of one embodiment of a particle of the instant disclosure.
FIG. 2 is a side cross-sectional view of another embodiment of a particle of the instant disclosure.

Additional Polymers:

In various embodiments, the article (10) and/or particles (12) also includes an intermediate polymer (18), e.g. disposed between the "exterior" polymer (16) (i.e., the polymer disposed on the exterior surface (26) of the thermoplastic elastomer as the outermost layer (24) of the particles (12)) and the thermoplastic elastomer foam (14), e.g. as set forth in FIG. 2. This intermediate polymer (18) may be sandwiched between the exterior polymer (16) and the thermoplastic elastomer foam (14). The intermediate polymer (18) may be disposed on and in direct contact with the thermoplastic elastomer foam (14) and/or the exterior polymer (16). Alternatively, the intermediate polymer (18) may be disposed on, but spaced apart from, the thermoplastic elastomer foam (14) and/or the exterior polymer (16) (not shown in the Figures).

In other embodiments, the article (10) and/or particles (12) includes an interior polymer (20) that may be disposed on and in direct contact with the thermoplastic elastomer foam (14) such that the thermoplastic elastomer foam (14) is disposed between the interior polymer (20) and the exterior polymer (16), e.g. as shown in FIG. 2. In this embodiment, the thermoplastic elastomer foam (14) is typically sandwiched between the interior polymer (20) and the exterior polymer (16). In another embodiment, the intermediate polymer (18) may also be present and be disposed in any position between the interior polymer (20) and the exterior polymer (16). For example, the interior polymer (20) may be disposed on and in direct contact with the thermoplastic elastomer foam (14) and/or the exterior polymer (16). Alternatively, the interior polymer (20) may be disposed on, but spaced apart from, the thermoplastic elastomer foam (14) and/or the exterior polymer (16). It is contemplated that one or more intermediate polymers (18) may be utilized and one or more interior polymers (20) may be utilized. It is contemplated that the interior polymer (20) may be disposed as an innermost layer of the particles (12) such that the interior polymer (20) is exposed to a hollow portion of the particles (12) as shown in FIG. 2 and not sandwiched between any layers. For example, the interior polymer (20) may only be in contact with another polymer (e.g. the thermoplastic elastomer foam (14)) on one side. In another example, the interior polymer (20) defines an interior surface of the particles (12).

Any one or more of the intermediate polymer (18) and/or the interior polymer (20) may be as described above relative to the exterior polymer (16) or different. The intermediate polymer (18), the interior polymer (20), and/or the exterior polymer (16) may all be the same or different from one another. In various embodiments, the interior polymer (20) is chosen from thermoplastic urethane (TPU), polyamide-6, and thermoplastic amide (TPA). In other embodiments, the intermediate polymer (18) is chosen from thermoplastic urethane (TPU), polyamide-6 (PA6), and thermoplastic amide (TPA).

Figure 3:
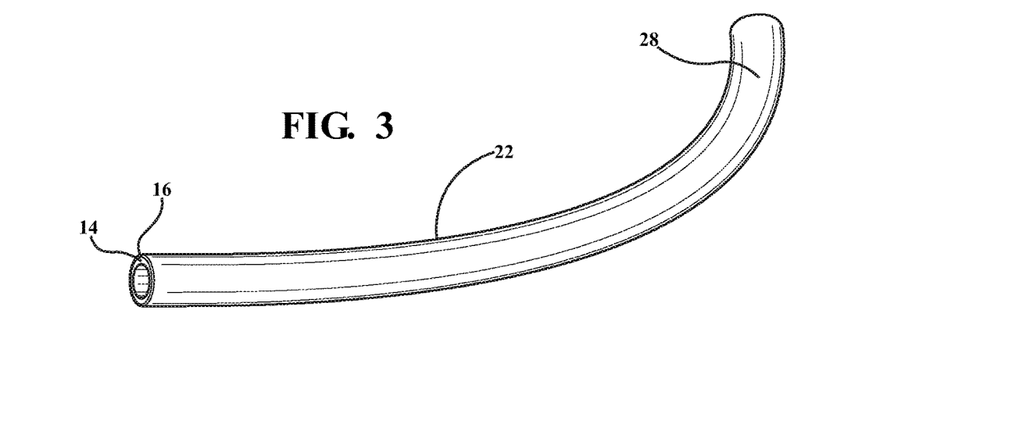
FIG. 3 is a side cross-sectional view of one embodiment of an extrudate of the instant disclosure.

Method of Forming the Article:

This disclosure also provides a method of forming the article (10). The method includes the step of providing the (non-foamed) thermoplastic elastomer and the aforementioned "exterior" polymer, as described above. The method also includes the step of co-extruding the (non-foamed) thermoplastic elastomer and the exterior polymer (16) to form a tubular extrudate (22) (e.g. as set forth in FIG. 3) wherein the (non-foamed) thermoplastic elastomer is foamed during co-extrusion (thereby forming the thermoplastic elastomer foam (14)) and the exterior polymer (16) is disposed on the thermoplastic elastomer foam (14) as an outermost layer (28) of the tubular extrudate (22). The step of co-extruding is not particularly limited and may be as known in the art. Said differently, the step of co-extruding may include one or more sub-steps, temperatures, conditions, etc., that are known in the art. For example, in various embodiments, the step of co-extruding utilizes the following parameters which may be modified as understood by those of skill in the art:

Die Type: Crosshead; extruder 1 (1½" dia.); Zone 1—340° F.; Zone 2—360° F.; Zone 3—370° F.;

Zone 4—370° F.; Clamp—370° F.; Adapter—370° F.; Head Pressure—4000 psi; Screw RPM—12.5, Screw Torque—18.5%; Extruder 2 (¾" dia.); Zone 1—275° F.; Zone 2—320° F.; Zone 3—340° F.; Clamp—340° F.; Adapter—340° F.; Head Pressure—3800 psi; Screw RPM—15; Screw Torque—31.6%; Die Head—370° F.; Die—370° F.; Take Off Motor 230 RPM; Rate Indicator 21.3. Alternatively, one or more parameters of co-extrusion may be as described in the Examples. In various additional non-limiting embodiments, all values and ranges of values between and including the aforementioned values are hereby expressly contemplated.

The method also includes the step of segmenting the tubular extrudate (22) to form the plurality of the particles (12). The step of segmenting is typically further defined as cutting or chopping but is not particularly limited.

The method further includes the step of disposing the plurality of particles (12) in a mold. The particles (12) are typically disposed in the mold in a random fashion, e.g. poured in. This typically allows for the random or three-dimensional orientation of the particles (12) in the final product. In various embodiments, the particles (12) are either (1) poured manually "by hand" into a mold, or (2) injected into a mold using an air conveyance system. Typically, the mold is filled while in an open position, allowing particles to "overfill" the mold. After the mold is closed, the particles are typically forced together which promotes more surface area contact. This is intended to promote increased adhesion.

The method also includes heating the plurality of particles (12) to form the article (10), e.g. such that the plurality of particles (12) are randomly oriented in the article (10). The step of heating is not particularly limited and may include heating by electricity, gas, steam, etc. In one embodiment, the step of heating is further defined as heating the particles (12) and/or the mold itself with steam, e.g. as in a steam chest crack molding process. In another embodiment, the step of heating (and/or the entire method) may be further defined as a steam chest crack molding process. The particular steps may be as known in the art and/or as described above.

Additional Embodiments

In one embodiment, the method includes loading the mold with the particles (12) and feeding steam to the particles (12) in the mold. The feeding of steam heats the particles (12) and can expand the thermoplastic elastomer foam (14). The feeding of steam can also melt or soften the exterior polymer (16) such that the particles (12) fuse, stick, or bond to one another. The method of this disclosure may include one or more steps, components, conditions, or processing parameters as described in US 2013/0291409, which is expressly incorporated herein in its entirety in various non-limiting embodiments.

In various embodiments, the particles (12) are loaded into the mold with atmospheric pressure and can be later pressurized within the mold. To this end, a variety of different methods may be used. For example, such steps may be achieved by reducing the volume of the mold. In some embodiments, to this end, a moveable part of the mold is moved such that the volume of the mold is reduced. In further embodiments, the mold is designed such that the pressure within the mold is locally varied. Alternatively, the particles (12) may be loaded into the mold already under pressure, e.g. with a locally varying pressure. That way, the manufacturing method may be accelerated.

The pressure to which the particles (12) are compressed in the mold may influence the density and the strength of the eventual article (10). The diameter of the particles (12) may be reduced by the exerted pressure. For example, with higher pressures, the particles (12) may be compressed and densified more strongly. By reducing the pressure, the particles (12) may re-expand to approximately their original diameters. The exterior polymer (16) may foam or not foam during the process and may collapse or not collapse during the process.

In still other embodiments, the method may include the step of closing the mold and pre-treating the mold with steam. The method may also include the step of cooling the mold with water and/or air that are fed through the mold. Thus, the article (10) and/or the particles (12) may be cooled indirectly via the mold. In certain embodiments, the duration of the method is about 3-15 minutes. The duration may alternatively be about 3-6 minutes for less elaborate methods. Still further, the method may have a duration of longer than 15 minutes.

This disclosure also provides the extrudate or the tubular structure (prior to chopping or segmenting) by itself independent of any particles or any article. Similarly, this disclosure also provides the plurality of particles by themselves, independent from any extrudate or tubular structure or article. The extrudate or tubular structure may be any as described above. Similarly, the plurality of particles may be any as described above.

In still other embodiments, the particles are covered by, or coated with, a commercially available adhesive (e.g. one or two component) and pressed together in a mold to form a desired article.

This disclosure further provides the article that is further defined as a shoe sole. In various embodiments, the shoe sole includes the particles that are formed using one or more polyether thermoplastic elastomers. The shoe sole may have one or more dimensions, attributes, or components as described in US 2013/0291409, which is expressly incorporated herein in its entirety in various non-limiting embodiments. Additionally, the description of softening temperature may be alternatively described as a softening range, as described in U.S. Pat. No. 5,674,600, which is expressly incorporated herein by reference in its entirety in one or more non-limiting embodiments. In various embodiments, this disclosure provides a capstock (e.g. the polymer disposed on the exterior surface) that allows for bonding of the particles at a low temperatures without ruining the rest of the structure of the particles and/or the article as a whole. For example, these advantages may be observed through one or more physical properties described above such as, but not limited to, density and ultimate breaking strength.

EXAMPLES

A series of articles are formed according to this disclosure. More specifically, a non-foamed thermoplastic elastomer is provided along with an exterior polymer. The thermoplastic elastomer and the exterior polymer are co-extruded to form a tubular extrudate wherein the thermoplastic elastomer is foamed during co-extrusion to form a thermoplastic elastomer foam and the exterior polymer is disposed on the thermoplastic elastomer foam as an outermost layer of the tubular extrudate. The tubular extrudate is then segmented to form a plurality of anisotropic tubular particles including the thermoplastic elastomer foam and the exterior polymer disposed on the thermoplastic elastomer foam as an outermost layer of the tubular particles. The plurality of anisotropic tubular particles are then disposed in a mold and heated to form the article. After formation, the articles are evaluated to determine density.

A first article is formed using Elastollan® 1180A10 as the thermoplastic elastomer (having a Shore hardness of 80A) and Elastollan® 880A13N as the exterior polymer. The thermoplastic elastomer is extruded and foamed with a combination of blowing agents: Elastollan Konz V2894 at 3% loading and Elastollan Konz V2893 at 3% loading. The thermoplastic elastomer has a foamed specific gravity of approximately 0.4 gram/mL. The tubing has an average outer diameter of 0.125 inches. The exterior polymer has an average wall thickness of 0.004 inches. The foamed thermoplastic elastomer has an average wall thickness of 0.030 inches. The plurality of anisotropic particles has a loose bulk density of 0.16 gram/mL. The plurality of anisotropic particles are molded to form articles having a density from 0.20 to 0.26 gram/mL.

A second article is formed using Elastollan® 1190A10 as the thermoplastic elastomer (having a Shore hardness of 90A) and Elastollan® 880A13N as the exterior polymer. The thermoplastic elastomer is extruded and foamed with a combination of blowing agents: Elastollan Konz V2894 at 3% loading and Elastollan Konz V2893 at 3% loading. The thermoplastic elastomer has a foamed specific gravity of approximately 0.4 gram/mL. The tubing has an average outer diameter of 0.125 inches. The exterior polymer has an average wall thickness of 0.004 inches. The foamed thermoplastic elastomer has an average wall thickness of 0.030 inches. The plurality of anisotropic particles has a loose bulk density of 0.16 gram/mL. The plurality of anisotropic particles are molded to form articles having a density from 0.20 to 0.26 gram/mL.

In various embodiments, the density of the thermoplastic elastomer foam can be minimized as the performance of the particle may depend on the modulus achieved from the exterior polymer. The lower softening/melting point of the exterior polymer may allow for lower processing temperatures during molding to avoid permanent distortion of the particles and subsequent densification of the article. Moreover, this disclosure may allow for formation of lower density articles while maintaining performance (e.g. energy absorption and return). Lower densities may allow the particles to better compete with traditional thermoset foams commonly seen in furniture cushions, mattresses, and automotive seating. A thermoplastic elastomer is also considered more "recycle friendly" than a thermoset polymer. This disclosure may also enable lower processing temperatures to be used to thermally bond the particles under pressure without permanently deforming them.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. An article having a density of from 0.03 to 0.45 g/cc and comprising a plurality of anisotropic hollow tubular particles that are randomly oriented in said article, wherein said tubular particles each comprise (i) an inner layer formed from a thermoplastic elastomer foam, (ii) an outermost layer encircling the inner layer formed from a polymer disposed on an exterior surface of said thermoplastic elastomer foam, and (iii) an intermediate polymer layer disposed between and in direct contact with the inner layer and the outermost layer,
wherein each of said thermoplastic elastomer foam and said polymer independently has a softening temperature determined according to DIN ISO 306, and wherein the softening temperature of said polymer is at least 5° C. lower than the softening temperature of said thermoplastic elastomer foam.

2. The article of claim 1 wherein said thermoplastic elastomer foam is a thermoplastic polyurethane foam.

3. The article of claim 2 wherein said thermoplastic polyurethane foam is the foamed reaction product of a polyether polyol, an isocyanate component, and a chain extender.

4. The article of claim 2 wherein said thermoplastic polyurethane foam is the foamed reaction product of a polyester polyol, an isocyanate component, and a chain extender.

5. The article of claim 2 wherein said thermoplastic polyurethane foam is the foamed reaction product of an aliphatic and/or olefinic polyol, an isocyanate component and a chain extender.

6. The article of claim 1 wherein said thermoplastic elastomer foam is formed from a thermoplastic polyurethane that has a hardness from 40A to 83D as determined using DIN ISO 7619-1.

7. The article of claim 1 wherein said thermoplastic elastomer foam is formed from a thermoplastic polyurethane that has a hardness from 80A to 95A as determined using DIN ISO 7619-1.

8. The article of claim 1 wherein said thermoplastic elastomer foam is chosen from thermoplastic polyester elastomers (TPE), thermoplastic styrenic elastomers (TPS), thermoplastic polyamides (TPA), thermoplastic vulcanates (TPV), thermoplastic polyolefins (TPO), and combinations thereof.

9. The article of claim 1 wherein said thermoplastic elastomer foam has a density of from 0.1 to 0.6 g/cc.

10. The article of claim 1 having an ultimate breaking strength of from 0.1 to 4.0 megapascal as determined using ASTM D 5035.

11. The article of claim 1 wherein said tubular particles are fused together at a plurality of points.

12. The article of claim 1 wherein said polymer that is disposed on the exterior surface of said thermoplastic elastomer foam is disposed on and in direct contact with said thermoplastic elastomer foam.

13. The article of claim 1 wherein each tubular particle further comprises an innermost polymer layer disposed on and in direct contact with said thermoplastic elastomer foam such that said thermoplastic elastomer foam is disposed between said innermost polymer layer and said intermediate polymer layer.

14. The article of claim 1 wherein said polymer that is disposed on the exterior surface of said thermoplastic elastomer foam is foamed.

15. The article of claim 1 wherein said polymer that is disposed on the exterior surface of said thermoplastic elastomer foam is non-foamed.

16. The article of claim 1 wherein said polymer that is disposed on the exterior surface of said thermoplastic elastomer foam is further defined as a thermoplastic polyurethane.

17. The article of claim 1 wherein each of said tubular particles independently has a length from 1 to 30 mm and a diameter from 1 to 30 mm.

18. The article of claim 1 that is further defined as a shoe sole, a cushion, a flooring material, or a flooring substrate.

* * * * *